Dec. 7, 1965     W. K. HENKELS     3,221,467
STRUCTURAL MEMBER
Filed Feb. 1, 1963     2 Sheets-Sheet 1
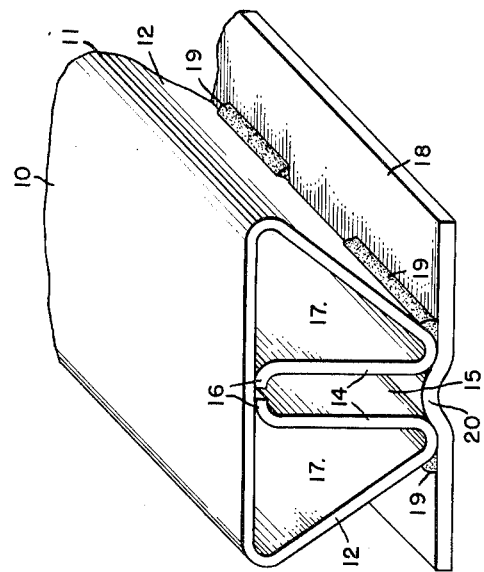
FIG. 2
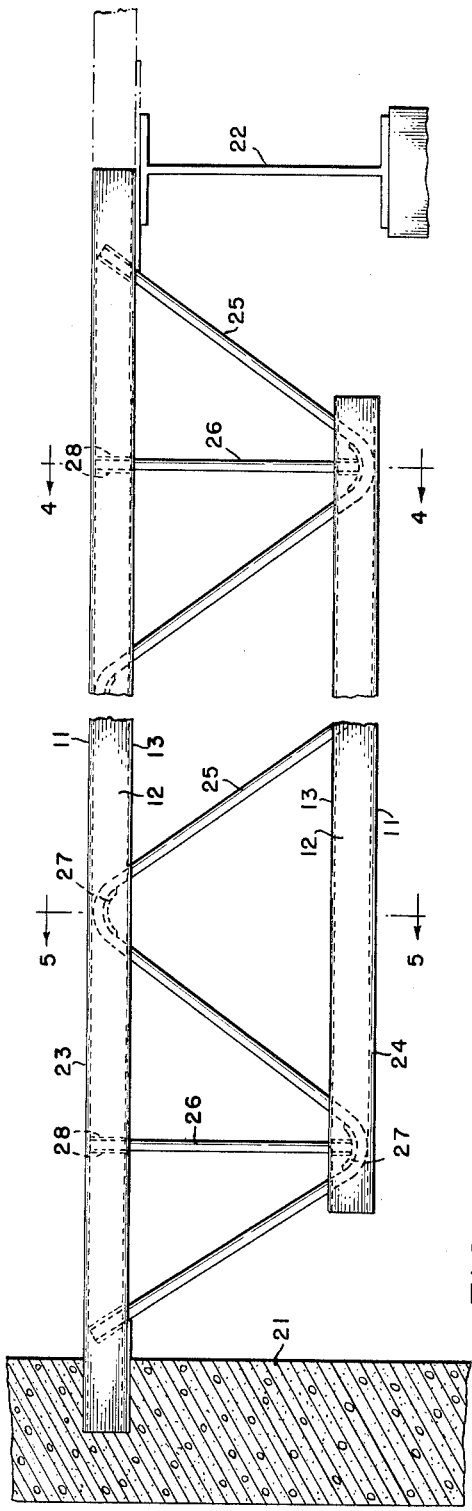
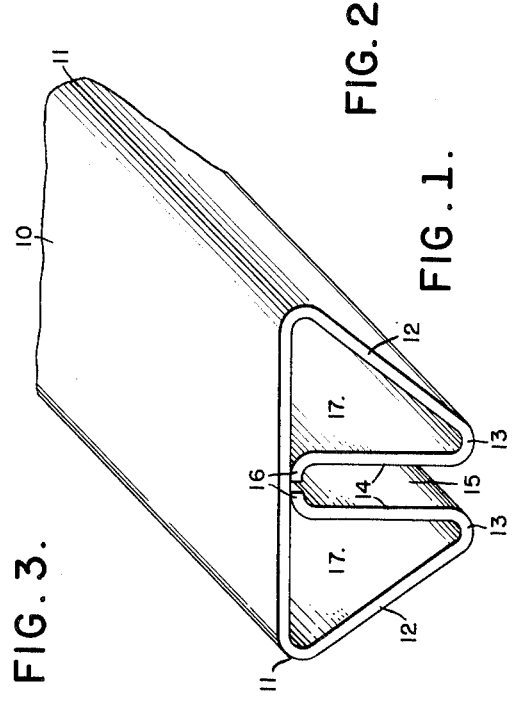
FIG. 1.
FIG. 3.
INVENTOR.
WILLIAM K. HENKELS
BY
Garvey & Garvey
ATTORNEYS Dec. 7, 1965
W. K. HENKELS
3,221,467
STRUCTURAL MEMBER
Filed Feb. 1, 1963
2 Sheets-Sheet 2
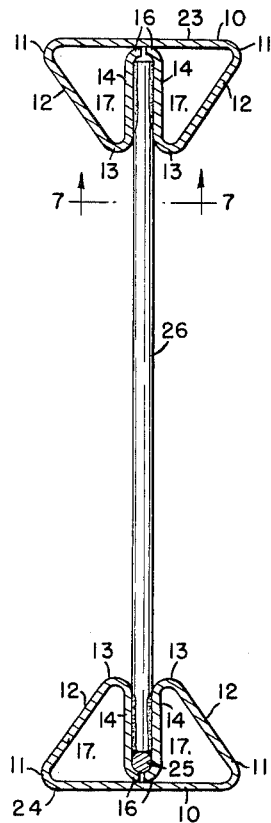
FIG. 4.
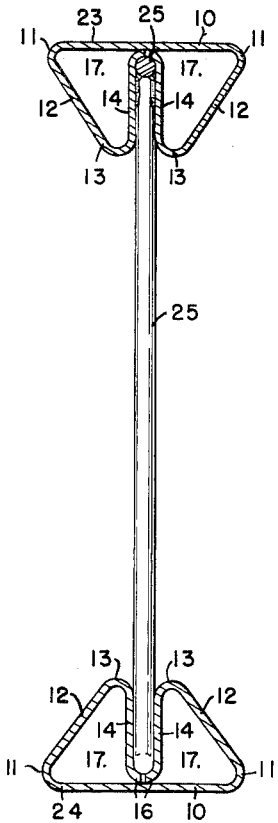
FIG. 5.
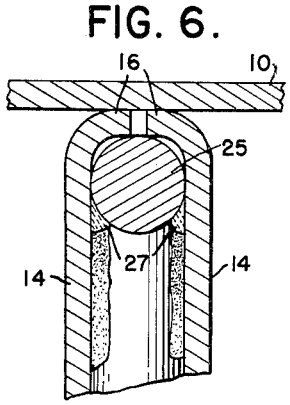
FIG. 6.
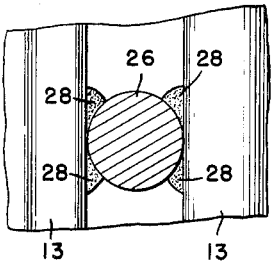
FIG. 7.
FIG. 8.
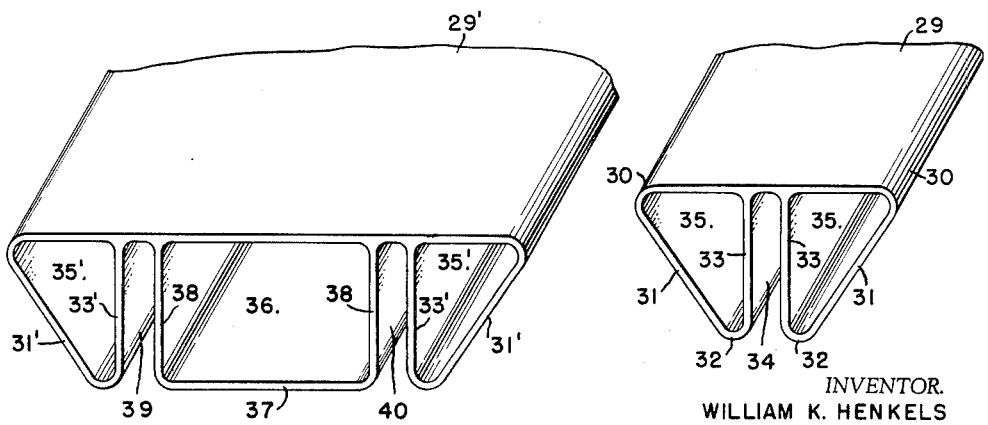
FIG. 9.
INVENTOR.
WILLIAM K. HENKELS
BY Garvey & Garvey
ATTORNEYS

United States Patent Office 3,221,467
Patented Dec. 7, 1965

3,221,467
STRUCTURAL MEMBER
William K. Henkels, Washington, D.C., assignor of one-half to American Metalcore Systems, Inc., Baltimore, Md.
Filed Feb. 1, 1963, Ser. No. 255,467
3 Claims. (Cl. 52—690)

This invention relates to a structural member, an object of which is to provide a building unit of superior strength capable of carrying heavy loads, the member requiring a minimum of material and readily adaptable for a variety of uses.

Another object is to provide a structural member of the character described and generally comprising interconnected tubular sections of substantially triangular shape in cross section, the member being particularly adapted for use in various assemblies as chords of open or closed members used as joists and trusses, as flanges for columns and beams, all of which may employ web systems comprising bars and tubes of different shapes and materials, as slabs, perforated, solid, or laminated, and as rails for balustrades, railings and fences, the construction of the structural member permitting ready connection with component parts of the respective assemblies by automation or other processes.

A further object is to provide a structural member of unitary construction, which may be fabricated or extruded.

Other objects will be apparent from the following description of the present preferred forms of the invention, taken with the annexed drawings, wherein:

FIG. 1 is a perspective view of a structural member made in accordance with the present invention;

FIG. 2 is a view similar to FIG. 1, illustrating the structural member fixed to a base plate;

FIG. 3 is a fragmentary side elevational view of a chord assembly showing another use of the present structural member;

FIG. 4 is a sectional view taken along the line 4—4 of FIG. 3, looking in the direction of the arrows, and showing to advantage the manner of inserting and welding component parts of the assembly within the structural member;

FIG. 5 is a sectional view taken along the line 5—5 of FIG. 3, looking in the direction of the arrows;

FIG. 6 is an enlarged sectional view illustrating the manner of welding a web of a chord assembly to the structural member;

FIG. 7 is an enlarged sectional view taken along the line 7—7 of FIG. 4, looking in the direction of the arrows;

FIG. 8 is a perspective view of a modified form of the present invention; and

FIG. 9 is a perspective view of another modified form of the present invention.

Referring now in greater detail to the drawings, there is illustrated in FIG. 1 a fabricated structural member made in accordance with the present invention which comprises a length of material of uniform thickness and width, the central section of which comprises a horizontal base section 10 of uniform width. The lateral margins of base section 10 are bent downwardly and inwardly at 11 to provide angular walls 12. At a predetermined point the lower extremities of angular walls 12 are bent upwardly at 13 to form vertical walls 14 which stand in opposed parallel relationship, thereby defining a longitudinal slot or recess 15 of predetermined width. The upper terminals of vertical walls 14 are preferably bent inwardly to form flanges 16 which are in engagement with the under face of base section 10 centrally of the latter, to provide substantial supporting surfaces. Base section 10, angular walls 12 and spaced vertical walls 14 thereby form a pair of interconnected, opposed tubular sections 17 of right angle triangular shape in cross section.

In FIG. 2 the structural members of the present invention is shown affixed to a base plate 18 by suitable means such as fillet welding 19. In order to facilitate the positioning of the structural member on base plate 18, the base plate is provided with a central, longitudinal protuberance 20 coextensive with the length of the base plate and adapted to be partially received in recess 15 of the structural member.

In FIG. 3 the structural member of the present invention is illustrated in a joist, one end of which is supported by a wall 21, and the other end of which is supported by a beam 22. In this form of the invention the structural member of the present invention is used as an upper chord 23 and a lower chord 24, the chords being so positioned that recesses 15 thereof are in opposed relation to each other. As shown to advantage in FIGS. 4 and 5, opposed recesses of the structural chords are adapted to receive the upper and lower extremities of angular webs 25 and vertical webs 26. Once angular and vertical webs are received in recesses 15 of the chords, they may be readily welded as indicated at 27 and 28, respectively. It is within the contemplation of the present invention to provide a structural member in which the recess 15 thereof is of approximately the same width as the diameter of web members 25 and vertical members 26, which are adapted to be received therein, thereby affording a tight fit and facilitating assembly. The provision of a structural member including recesses as herein described also lends itself to the assembly of multi-part units including welding by automation processes.

In FIG. 8 there is illustrated an extruded form of the present invention which may be of metallic or plastic construction. The extruded structural member includes a horizontal base section 29, the lateral margins of which are extended downwardly and inwardly at 30 to provide angular walls 31, the lower extremities of which extend upwardly at 32 to form vertical walls 33 which are in parallel spaced relation to each other and perpendicular to base section 29. A slot or recess 34 is thereby formed between vertical walls 33. This effects a structural member comprising interconnected, opposed tubular sections 35 of right angle triangular shape in cross section.

In FIG. 9 there is illustrated a modified form of an extruded structural member shown in FIG. 8, which includes a base section 29' which is substantially wider than base section 29 of the form of invention illustrated in FIG. 8, the lateral margins of which, however, are formed to provide similar angular walls 31' and vertical walls 33', thereby defining right angle, triangular, tubular sections 35'. It will be noted from a consideration of FIG. 9 that, by virtue of the increased width of base section 29', triangular, tubular sections 35' are spaced farther apart than sections 35 of the form of invention illustrated in FIG. 8, in which space is located a substantially rectangular tubular section 36 comprising a bottom wall 37 and side walls 38. A portion of the base plate 29' forms the top wall of tubular section 36. Side walls 38 are spaced from vertical walls 33' of tubular sections 35' to provide a pair of spaced parallel recesses or slots 39 and 40 of uniform depth and width.

The structural member of the present invention, either in its fabricated or extruded form, affords a building unit which is capable of carrying heavy loads and is superior to comparable members. Furthermore, by virtue of its structural arrangement of parts, manufacture thereof may be economically carried out and it may be interengaged with other construction elements to form various assemblies such as joists and trusses, columns and beams, slabs, balustrades, railings and fences. The structural arrangement of the present invention also readily permits other elements to be fixed thereto by automation or other processes.

While there has been herein shown and described, the presently preferred forms of the present invention, it is to be understood that such has been done for purposes of illustration only, and that various changes may be made therein within the scope of the claims hereto appended.

What is claimed is:

1. A structural member comprising a strip of flexible material, said material comprising a base section, the lateral margins of said base section being bent longitudinally at an angle to the base section to form converging walls of predetermined lengths, the lower terminals of said converging walls being bent upwardly in spaced parallel relation to form vertical walls, thereby providing a longitudinal slot therebetween, the upper terminals of said vertical walls being bent inwardly to provide flanges, the upper face of each of which is in supporting contiguous engagement with the underface of said base section, centrally of the latter.

2. A structural member comprising an elongated flat base section, the lateral margins of said base section extending downwardly and inwardly at an angle to provide converging walls, vertical walls issuing from the lower terminals of said converging walls, said vertical walls extending upwardly in parallel, spaced relation into supporting contiguous engagement with the underface of said base section, thereby forming spaced tubular sections which are substantially triangular in cross section, and a substantially rectangular tubular section in the space between said spaced, triangular tubular sections, said rectangular tubular section including vertical spaced walls in spaced parallel relation to the vertical walls of said triangular tubular sections, and depending from said base section, a bottom wall extending between the lower terminals of said spaced vertical walls, and a top wall of the rectangular tubular section formed by a portion of said base section.

3. A chord assembly including a structural member comprising a base section, the lateral margins of said base section extending downwardly a predetermined distance to provide converging walls, vertical walls issuing from the lower terminals of said converging walls, said vertical walls extending upwardly in parallel spaced relation into supporting contiguous engagement with said base section, thereby forming a longitudinal recess between said vertical walls, a second structural member similar in construction to said first structural member, the structural members being vertically spaced with their longitudinal recesses in opposed relationship, web members between said structural members, the upper and lower limits of said web members being positioned within the longitudinal recesses of the structural members, and means rigidly securing the limits of said web members to said vertical walls defining the longitudinal recesses of said structural members.

References Cited by the Examiner

UNITED STATES PATENTS

| D. 25,412 | 4/1896 | Jones | 189—41 X |
| 939,343 | 11/1909 | Snyder | 189—37 X |
| 1,179,820 | 4/1916 | Gilliland | 189—41 X |
| 1,462,533 | 7/1923 | Clark | 189—37 X |
| 1,500,235 | 7/1924 | Clark | 189—37 |
| 1,960,652 | 5/1934 | Wendt | 189—37 X |
| 2,169,253 | 8/1939 | Kotrbaty | 189—37 |
| 2,405,917 | 8/1946 | Watter | 189—37 |

FOREIGN PATENTS

| 230,690 | 10/1960 | Australia. |
| 473,613 | 10/1937 | Great Britain. |
| 413,006 | 3/1946 | Italy. |
| 164,286 | 9/1933 | Switzerland. |

FRANK L. ABBOTT, *Primary Examiner.*

RICHARD W. COOKE, Jr., *Examiner.*